United States Patent [19]

Yamaba

[11] Patent Number: 4,776,702

[45] Date of Patent: Oct. 11, 1988

[54] DEVICE FOR COLOR DISTINCTION

[75] Inventor: Kazuo Yamaba, Ibaraki-ken, Japan

[73] Assignees: Agency of Industrial Science & Technology; Ministry of International Trade & Industry, both of Tokyo, Japan

[21] Appl. No.: 30,000

[22] Filed: Mar. 26, 1987

[30] Foreign Application Priority Data

Mar. 26, 1986 [JP] Japan .................................. 61-68058

[51] Int. Cl.$^4$ ............................................. G01J 3/51
[52] U.S. Cl. .................................. 356/405; 250/226; 356/417; 356/425
[58] Field of Search ............... 356/404, 406, 407, 416, 356/425, 405, 419; 250/226; 209/580, 581, 582, 585

[56] References Cited

U.S. PATENT DOCUMENTS 3,527,540 9/1970 Bowker et al. ..................... 356/404
4,494,876 1/1985 Van Wandelen ................... 356/404

FOREIGN PATENT DOCUMENTS 3401475 7/1985 Fed. Rep. of Germany ...... 356/406

Primary Examiner—F. L. Evans
Attorney, Agent, or Firm—Oblon, Fisher, Spivak, McClelland & Maier

[57] ABSTRACT

A half mirror and two dichroic mirrors having different characteristics are provided on an optical path of measurement light from an object, and four sensing devices are provided on optical paths of reflected or transmitted light from these mirrors. Calculations are performed on the outputs of the four sensing devices, and the resultant values are compared with parameters stored in a microcomputer to thereby effect color distinction.

2 Claims, 8 Drawing Sheets

DEVICE FOR COLOR DISTINCTION

FIELD OF THE INVENTION

This invention relates to a device for color distinction based on tristimulus values and, more particularly, to a color distinction device, which is suited for use in a system for sorting products by utilizing color information in a production line.

BACKGROUND OF THE INVENTION

In the usual lens system, there always arises color aberration caused by the refractive index. This will be explained with reference to FIG. 1. When a sensing device is disposed behind a lens L as shown, it is observed that the intensity of the blue and green components of light is higher on the lens side of the focal point f while the intensity of the red component of light is higher behind the focal point. To cope with this problem, it has been the practice to use an achromatic lens, use a monochromatic light source or perform compensation of the color aberration in the visible wavelength range.

In a sensing device for color distinction with such aberration compensation means, however, color errors are apt to occur depending on the location of the device. Further, with commercially available sensing devices for color distinction based on tristimulus values it is impossible to realize accurate color distinction of an object at a given measuring point because of the fact the individual sensing devices have different optical axes. Accordingly heretofore, the color distinction has been done by approximation.

OBJECT AND SUMMARY OF THE INVENTION

An object of the present invention is to provide a device for color distinction which permits color distinction with high accuracy irrespective of the aberration of lenses, the location of the device and variation in the distance between the device and an object whose color is to be distinguished.

According to the invention, there is provided a device for color distinction which comprises half mirror means and dichroic mirror means, these means being provided on an optical path of measurement light emitted from a particular point on an object whose color is to be distinguished, a complementary sensing device provided on the optical path of the reflected light from the half mirror means, first optical sensing means provided on the optical path of the reflected light from the dichroic mirror means, second optical sensing means provided on the optical path of the transmitted light from the dichroic mirror means, and calculating means connected to the complementary sensing device and optical sensing means for effecting color distinction of the object through calculations on the output of the complementary sensing device and outputs of the first and second sensing means.

According to the invention, by using the output of the complementary sensor the number of color distinction parameters is increased, so that it is possible to permit large tolerances in the color distinction parameters and effect color distinction with high accuracy irrespective of variations in the quantities of light incident on the optical sensing means with changes in the distance between the object and color distinction device.

The above and other objects and features of the invention will become more apparent from the following detailed description with reference to the accompanying drawings.

DETAILED DESCRIPTION OF THE PREFERRED EMBODIMENTS

Figure 1:
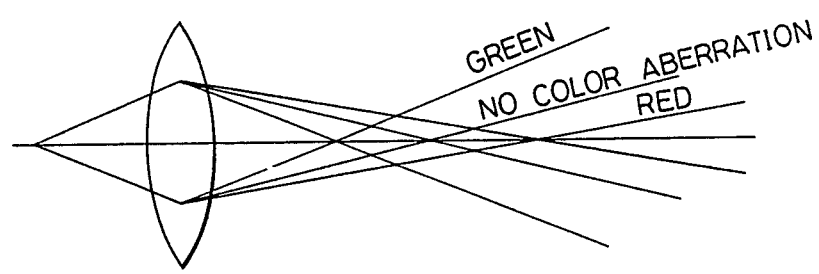
FIG. 1 is a view for explaining color aberration due to refractive index in the lens system.
Figure 2:
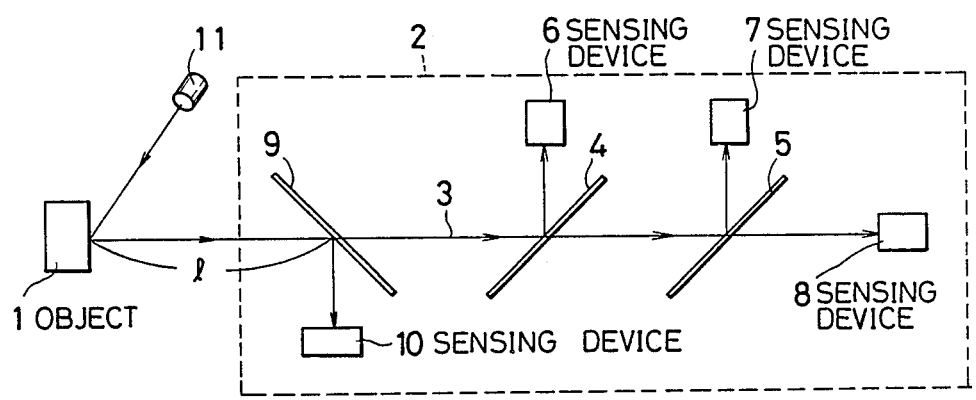
FIG. 2 is a schematic view showing a first embodiment of the device for color distinction according to the present invention.

FIG. 2 shows a first embodiment of the color distinction device 2 according to the present invention. On an optical path 3 of light for measurement emitted from a particular point on an object 1, a half mirror 9 and two dichroic mirrors 4 and 5 having different spectral reflectance characteristics are provided in the order mentioned and at a distance from one another. These dichroic mirrors are inclined with respect to the optical path 3. A complementary sensing device 10 is provided on the optical path of the reflected light from the half mirror 9.

A first optical sensing device 6 is provided on the optical path of the reflected light from the first dichroic mirror 4. A second optical sensing device 7 is provided on the optical path of the reflected light from the second dichroic mirror 5. A third optical sensing device 8 is provided on the optical path of the transmitted light from the second dichroic mirror 5, which path is the same as the optical path 3. The four optical sensing devices 6, 7, 8, 10 are connected to a microcomputer 13 through the electrical circuit 12 in FIG. 4, which effects distinction of the color of the light for measurement through calculations on the outputs of the sensing devices.

The sensing devices 6 to 8 and 10 are all sensitive to the visible light and have very flat spectral distribution characteristics in the visible wavelength range.

The two dichroic mirrors 4 and 5 are inclined by the same angle with respect to the optical path 3. Light of measurement is incident on the front side of the dichroic mirror 4 at an angle. This incidence angle is desirably in the neighborhood of 45° in relation to the permeability.

The dichroic mirror is one which is constructed by forming a multi-layer thin film of a dielectric by means of vacuum deposition on the surface of quartz or ordinary glass having smooth surfaces and can reflect or transmit light in a particular wavelength range through interference of light by the thin films. According to the present invention, the two dichroic mirrors 4 and 5 are two of three dichroic mirrors having different spectral reflectance characteristics with respect to the red, green and blue or like components of visible light. More specifically, they have the following characteristics.

Figure 3A:
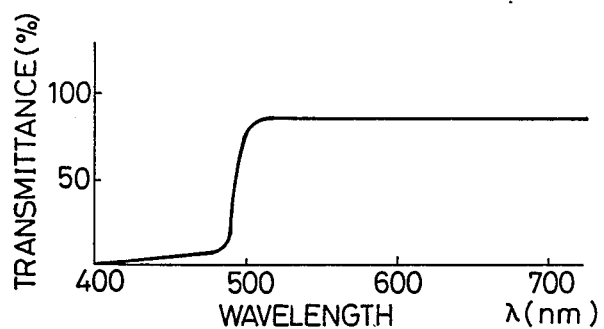
FIG. 3(a) is a graph showing an embodiment of spectral reflectance characteristic of a dichroic mirror used for the color distinction device shown in FIG. 2.
Figure 3B:
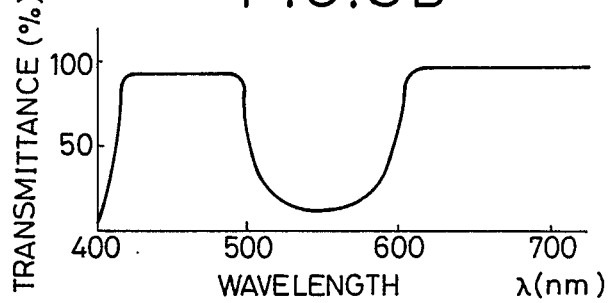
FIG. 3(b) is a graph showing an another embodiment of the spectral reflectance of a dichroic mirror.

FIGS. 3(a) and 3(b) show two different examples of dichroic mirror characteristics, i.e., the transmittance of dichroic mirrors when the angle of incidence is set to 45°. More particularly, FIG. 3(a) shows a characteristic which reflects blue and transmits green and red light components. FIG. 3(b) shows a characteristic which reflects green and transmits blue and red light components. There are also dichroic mirrors which reflect red and transmit blue and green light components, and these mirrors may be suitably utilized if desired.

Where a dichroic mirror having the transmittance characteristic as shown in FIG. 3(a), i.e., reflecting blue and transmitting green and red light components, is used as the dichroic mirror 4 and a dichroic mirror having a transmittance characteristic as shown in FIG. 3(b), i.e., reflecting green and transmitting blue and red components, is used as the dichroic mirror 5, the color distinction of light for measurement can be obtained with the above color distinction device as follows.

The optical sensing device 6 is provided in an orientation such that it has the highest sensitivity to the reflected light of the measurement light if the dichroic mirror 4 is assumed to be a perfect reflecting surface. Since the dichroic mirror 4 has the characteristic shown in FIG. 3(a) noted above, the blue component of the measurement light is incident as the reflected light to the optical sensing device 6. The transmitted light from the dichroic mirror 4 contains the green and red components as remaining components. For this reason, only the green component is reflected by the dichroic mirror 5 to be incident on the optical sensing device 7 provided on the optical path of the reflected light. The transmitted light consists of the sole red component which is incident on the optical sensing device 8 provided on the optical path 3.

To effect color distinction of the object 1 with the color distinction device 2 having the above construction, the object 1 is illuminated from a well-known light source 11, e.g., a fluorescent lamp.

The measurement light from the object 1 is partly reflected by the half mirror 9 provided on the optical path 3 to be incident on the complementary sensing device 10. The transmitted light from the half mirror 9 is incident on the first dichroic mirror 4, which reflects only the blue component which is incident on the optical sensing device 6 on the optical path of the reflected light. The transmitted light from the first dichroic mirror 4 is incident on the second dichroic mirror 5, which reflects the green component and transmits the red components, these components being incident on the respective optical sensing devices 7 and 8.

The output signals (photovoltaic currents) received by the optical sensing devices 6, 7 and 8 and corresponding to tristimulus values X, Y and Z are fed to electrical circuits provided for the respective tristimulus values.

Figure 4:
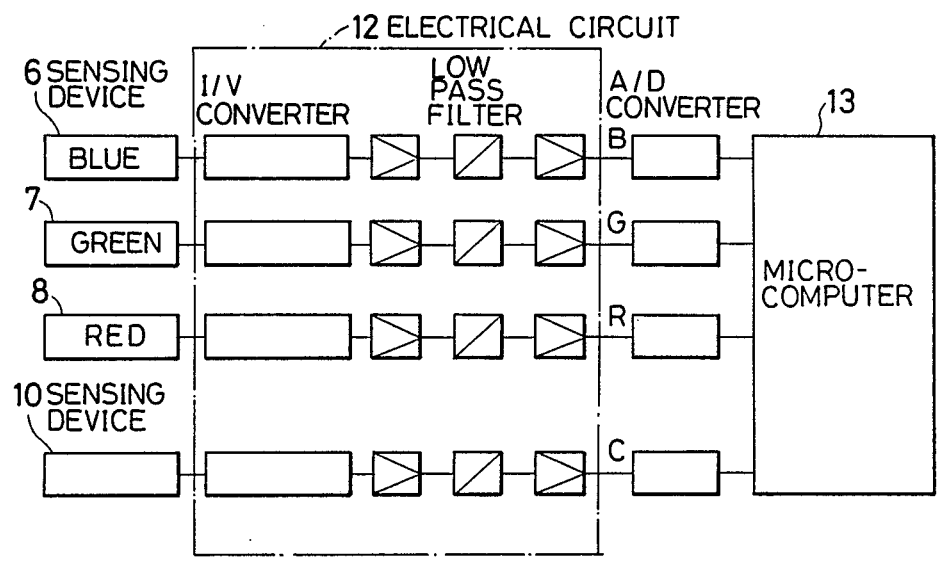
FIG. 4 is a signal processing circuit of a color distinction device shown in FIG. 2.

FIG. 4 shows an electrical circuit 12 for processing the output signals from the sensing devices 6, 7, 8 and 10. The photovoltaic currents from the sensing devices and fed to the electric processing circuit 12 are converted into voltages and then fed through amplifiers to low-pass filters for cutting frequency components due to the fluorescent lamp. The outputs of the low-pass filters are fed to amplifiers for calibrating the output voltages. The outputs of the last stage amplifiers in the electrical circuit are fed through A/D converters to a microcomputer 13.

In the microcomputer 13, chromaticity coordinates x, y and z of the standard chromatic system X, Y, Z are obtained from analog input signals, R, G and B through the following calculation.

$$x = \frac{R}{B + G + R} \quad (1)$$

$$y = \frac{G}{B + G + R} \quad (2)$$

$$z = \frac{B}{B + G + R} = 1 - x - y \quad (3)$$

Also, the red component ratio s is obtained from the analog input signal C from the complementary sensing device 10 using an equation (4) as follows:

$$s = \frac{R}{C} \quad (4)$$

The chromaticity coordinates x, y and z and red component ratio s as well as the analog input signal C are color distinction parameters and serve as reference values for the individual colors. From these five values (x, y, z, s and C) threshold values for the color distinction are obtained using the equations (5) to (9). These values are stored as reference values for color distinction in a microcomputer memory.

When determining the color of an object being conveyed on a belt conveyor in an actual production line, the distance l between the color distinction device and object is not constant, or the intensity of the illumination light is not constant. When the distance varies, the amounts of light incident on the optical sensing devices 6, 7 and 8 correspondingly vary. When the distance l between the object 1 and color distinction device 2 increases, the amount of light incident on each optical sensing device is reduced to reduce the photoelectron current generated. Particularly, the optical sensing device for the blue range on the short wavelength side is liable to be adversely affected by the dark current because the photocurrent is low. Therefore, the value of B in the equations (1) to (3) becomes instable.

According to the present invention the color distinction can be done with high accuracy even in such a situation, so that the values of x, y and z in the equations (1) to (3), the value of s in the equation (4) and analog output signal C from the complementary sensing device are used as color distinction elements.

When the complementary sensing device does not provide the output C, the light quantity Q is usually the sum of the red component R, green component G and blue component B. However, although Q=C, it cannot be said that the light quantity is accurately Q=R+G+B. Particularly, when the distance l is varied, the difference between Q and R+G+B is increased, so that it is difficult to obtain accurate color distinction with the light quantity as subject. The same thing can be said for s obtained in the equation (4), that is, by using s the distinction of blue, violet or like wavelength systems can be facilitated. This is so because it is possible to greatly extract the red component R contained in the blue component.

The color distinction using the above five color distinction parameters will now be described with reference to the flow chart shown in FIG. 5.

The microcomputer 13 performs the following calculations to obtain threshold values for distinction of each color on the basis of the equations (1) to (4) and the signal C from the complementary sensing device.

$$x_{max}, x_{min} = (1 \pm k_1)x \quad (5)$$

$$y_{max}, y_{min} = (1 \pm k_2)y \quad (6)$$

$$z_{max}, z_{min} = (1 \pm k_3)z \quad (7)$$

$$C_{max}, C_{min} = (1 \pm k_4)C \quad (8)$$

$$s_{max}, s_{min} = (1 \pm k_5)s \quad (9)$$

In the equations (5) to (9), $k_1$ to $k_5$ are color distinction coefficients, and experiments conducted with the device according to the invention show that the optimum value ranges from 0.05 to 0.1.

Figure 5:
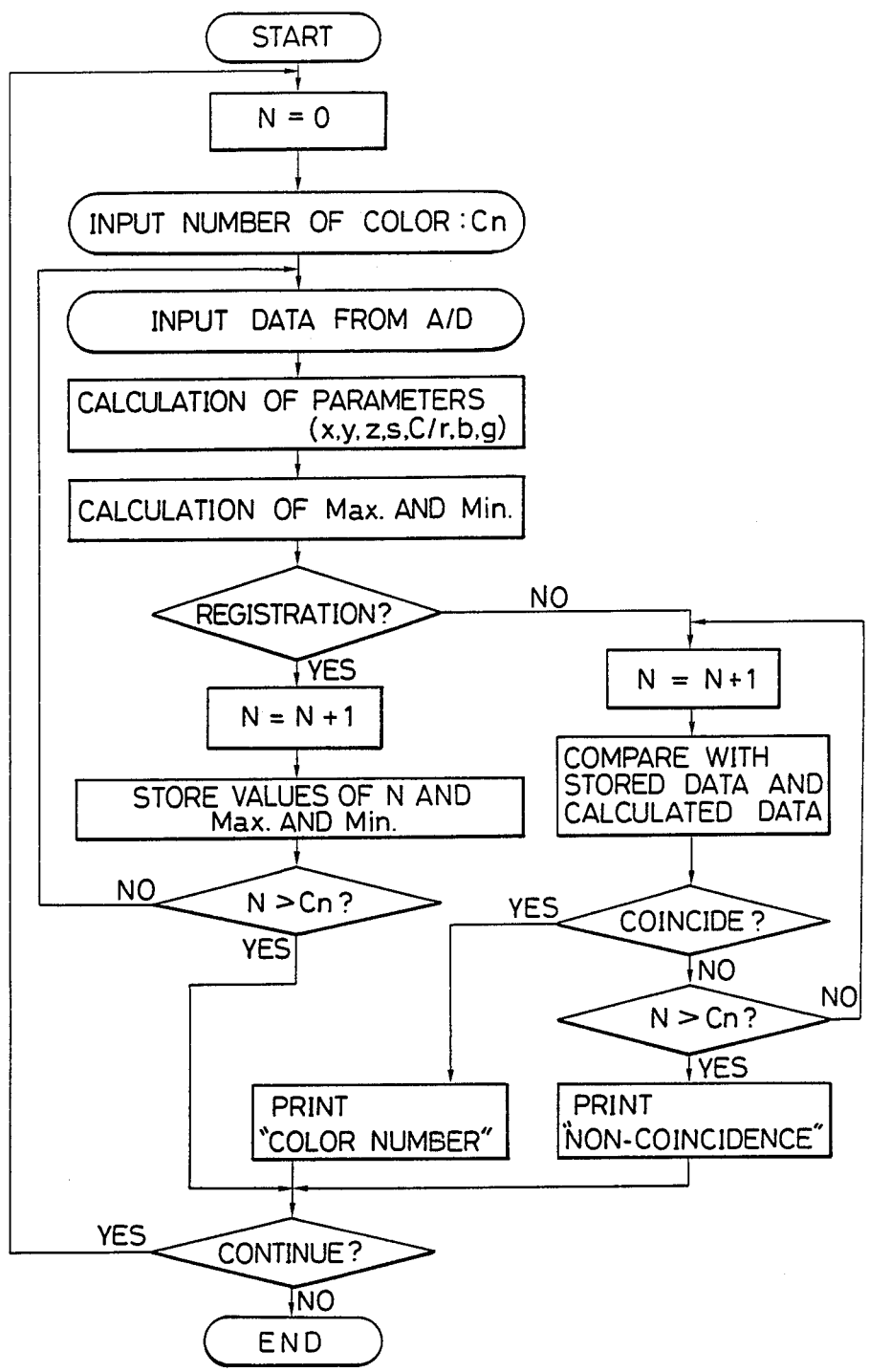
FIG. 5 is a flow chart showing a process of color distinction according to the invention.

Referring to FIG. 5, $C_n$ represents a forecast data registration number or number of data stored in the microcomputer memory. Data of the registration number and values of the equations (5) to (9) are stored in the memory of the microcomputer 13. After the registered color number $C_n$ has been designated, the A/D converters provide voltages corresponding to the photocurrents from the optical sensing devices 6, 7 and 8 and complementary sensing device 10, and calculations of the equations (5) to (9) are performed according to the values of these voltages. In the registration of color data, data is stored in the memory of the microcomputer 13 a number of times corresponding to the registered color number.

In the color distinction, the value obtained by each optical sensing device and complementary sensing device and calculated in the same manner as described above is compared to the data values stored in the memory of the microcomputer 13, and the value of N when the two compared values coincide constitutes the color registration number.

When the two values do not coincide, the calculated value is compared to the next value stored in the memory to effect color distinction of the color detected by the optical sensing devices.

As has been shown, with the color distinction device according to the present invention not only the output of the sensing devices for the individual color components but also part of the measured light are directly detected by the complementary sensing device. Thus, the parameters for the color distinction are increased, so that it is possible to set the color distinction coefficients k to be large compared with the prior art method of color distinction, which uses only the sensing devices for the individual color components. Further, the fact that it is possible to set the color distinction coefficients to be large is particularly effective for the distinction of blue, violet or like color components in low sensitivity, short wavelength ranges.

Further, even if the quantity of incident light on the sensing devices is changed with a change in the distance between the color distinction device and object.

Figure 6:
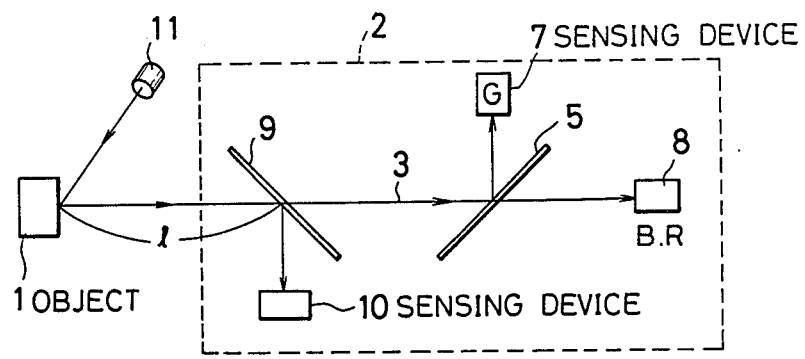
FIG. 6 is a schematic view showing a second embodiment of the device for color distinction according to the invention.

In the embodiment of the color distinction device 2 shown in FIG. 2, one half mirror and two dichroic mirrors are used with four optical sensing devices to effect color distinction of an object according to the detection signals B, G, R and C from the individual sensing devices. FIG. 6 shows a different method of color distinction of an object with one half mirror, one dichroic mirror and three optical sensing devices.

The device shown in FIG. 6 is different from the device shown in FIG. 2 in that it comprises a dichroic mirror 5 having a characteristic of reflecting green and transmitting blue and red components, as shown in FIG. 3(b), optical sensing devices 7 and 8 having sensitivity to the respective green and red components, and a complementary sensing device 10, and the dichroic mirror for reflecting the blue component and the optical sensing device therefor are omitted.

Referring to FIG. 6, light from an object 1, for which color distinction is to be done, is partly reflected by the half mirror 9 on the optical path 3 to be incident on the complementary sensing device 10, and the rest of light is transmitted through the half mirror 9 to the dichroic mirror 5. The dichroic mirror 5 reflects the green component to be incident on the optical sensing device 7. The blue and red components of light transmitted through the mirrors are incident on the optical sensing device 8.

The sensing devices 7, 8 and 10 provide current signals corresponding to the quantities of incident light. These current signals are fed to an electrical circuit 12 which has the construction as shown in FIG. 4, for conversion into voltage signals, cutting of variation components and the conversion in the A/D converters into analog signals to be fed to the microcomputer 13.

The microcomputer 13 performs calculations on the signals G and R from the respective optical sensing devices 7 and 8 and signal C from the complementary sensing device 10 on the basis of following equations (10) to (12) to obtain data r, b and g for the color distinction.

$$r = \frac{R}{3C} \quad (10)$$

$$b = \frac{3C - R - G}{3C} \quad (11)$$

$$g = \frac{G}{3C} \quad (12)$$

The values of x, y and z shown in the equations (1) to (3) are $0 < x < 1$, $0 < y < 1$ and $0 < z < 1$. Among r, b and g in the equations (10) to (12), the value of b may be less than zero. This is so because 3C may be greater than R+G as shown in the equation (11).

In the above way, reference colors (e.g., red, orange, yellow, yellow green, green, bluish green, blue, bluish violet, . . . ) are first measured by the color distinction device, r, b and g are determined according to the outputs of the optical sensing devices 7, 8 and 10, and the threshold values of the individual reference colors are determined according to these information. In this way, the color distinction can be obtained depending on whether the output of each of the sensing devices 7, 8 and 10 representing a given color is within a predetermined threshold value for each reference color.

Now, examples of the color distinction according to the present invention will be described.

In the color distinction device shown in FIG. 2, for the illumination a FL15W fluorescent lamp (with x and y values in the chromaticity coordinates of x=0.345 and y=0.408 at a field of 1°) was used, a commercially available colored paper sheet was used as the object, a dichroic mirror with a transmittance of 50% and a wavelength position of 500±10 nm was used as the first dichroic mirror, a dichroic mirror with a transmittance of 50% and a wavelength position of 505±10 nm was used as the second dichroic mirror, and integration PIN type silicon photodiodes were used as the four optical sensing devices. Further, small diameter lenses and optical fibers were used for the optical paths in the color distinction device.

A fluorescent lamp was secured at a distance of 35 cm from and obliquely upwards by an angle of 45° from the center of the object (i.e., colored paper sheet) with dimensions of 12 cm by 12 cm, the distance from the colored paper sheet to the half mirror was set to 15 cm, and a white (wh) color sheet is illuminated with a fluorescent lamp. The illumination intensity on the white paper sheet was approximately 1,000 lux, and the chromaticity coordinates were x=0.361 and y=0.387. The inputs to the A/D converters were adjusted by the amplifiers such that they were all 100 mV.

After the above adjustments had been carried out, the input voltage values R, G, B and C to the four A/D converters were measured with 12 different colored paper sheets, i.e., of red (r), orange (o), brown (br), green (g), yellow (yl), yellow green, (yg), blue (b), dark blue (db), violet (v), light blue (lb), light yellow (ly) and pink (p) paper sheets. The results were as shown in Table 1.

TABLE 1

| Input No. $C_n$ | Color | R (mV) | G (mV) | B (mV) | C (mV) |
|---|---|---|---|---|---|
| 1 | white | 100 | 100 | 100 | 100 |
| 2 | red | 60 | 12.5 | 17.5 | 23.3 |
| 3 | orange | 82.5 | 35 | 25 | 46.7 |
| 4 | brown | 32.5 | 15 | 12.5 | 18.3 |
| 5 | yellow | 90 | 90 | 30 | 76.7 |
| 6 | yellow green | 40.0 | 62.5 | 22.5 | 45 |
| 7 | green | 12.5 | 17.5 | 12.5 | 13.3 |
| 8 | blue | 17.5 | 17.5 | 45 | 21.7 |
| 9 | dark blue | 12.5 | 7.5 | 32.5 | 11.7 |
| 10 | violet | 17.5 | 7.5 | 30 | 11.7 |
| 11 | light blue | 62.5 | 75 | 90 | 73.3 |
| 12 | light yellow | 87.5 | 82.5 | 45 | 73.3 |
| 13 | pink | 90 | 57.5 | 82.5 | 71.7 |

The values of x, y, z and s were obtained from the values of R, G, B and C shown in Table 1 on the basis of the equations (1) to (4). The results were as shown in Table 2.

TABLE 2

| Input No. $C_n$ | Color | x | y | z | s |
|---|---|---|---|---|---|
| 1 | white | 0.333 | 0.333 | 0.333 | 1 |
| 2 | red | 0.667 | 0.139 | 0.194 | 0.6 |

TABLE 2-continued

| Input No. $C_n$ | Color | x | y | z | s |
|---|---|---|---|---|---|
| 3 | orange | 0.579 | 0.246 | 0.175 | 0.825 |
| 4 | brown | 0.542 | 0.250 | 0.208 | 0.325 |
| 5 | yellow | 0.429 | 0.429 | 0.143 | 0.9 |
| 6 | yellow green | 0.320 | 0.500 | 0.180 | 0.4 |
| 7 | green | 0.294 | 0.294 | 0.412 | 0.125 |
| 8 | blue | 0.219 | 0.219 | 0.563 | 0.175 |
| 9 | dark blue | 0.238 | 0.143 | 0.619 | 0.125 |
| 10 | violet | 0.318 | 0.136 | 0.545 | 0.175 |
| 11 | light blue | 0.275 | 0.396 | 0.330 | 0.625 |
| 12 | light yellow | 0.407 | 0.384 | 0.209 | 0.875 |
| 13 | pink | 0.391 | 0.250 | 0.359 | 0.9 |

The threshold values for the individual colors were obtained from the values of x, y, z, s and C in the tables above on the basis of the equations (5) to (9).

Figure 7:
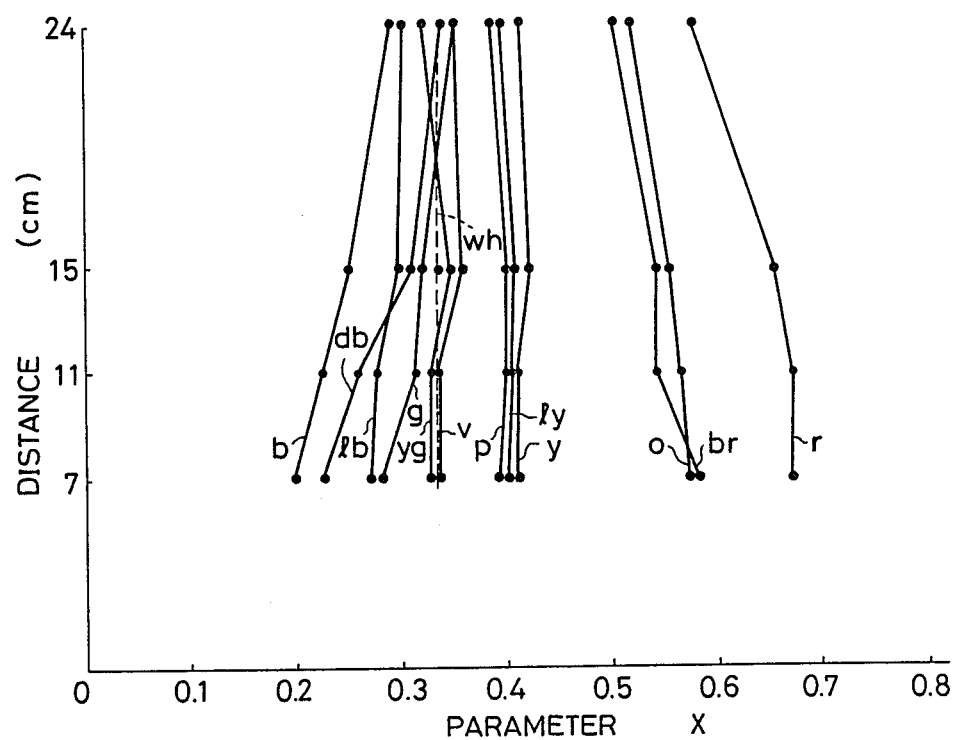
FIG. 7 is a graph showing the relation between the distance and color distinction parameter x for 13 different colors measured with the color distinction device shown in FIG. 2.
Figure 8:
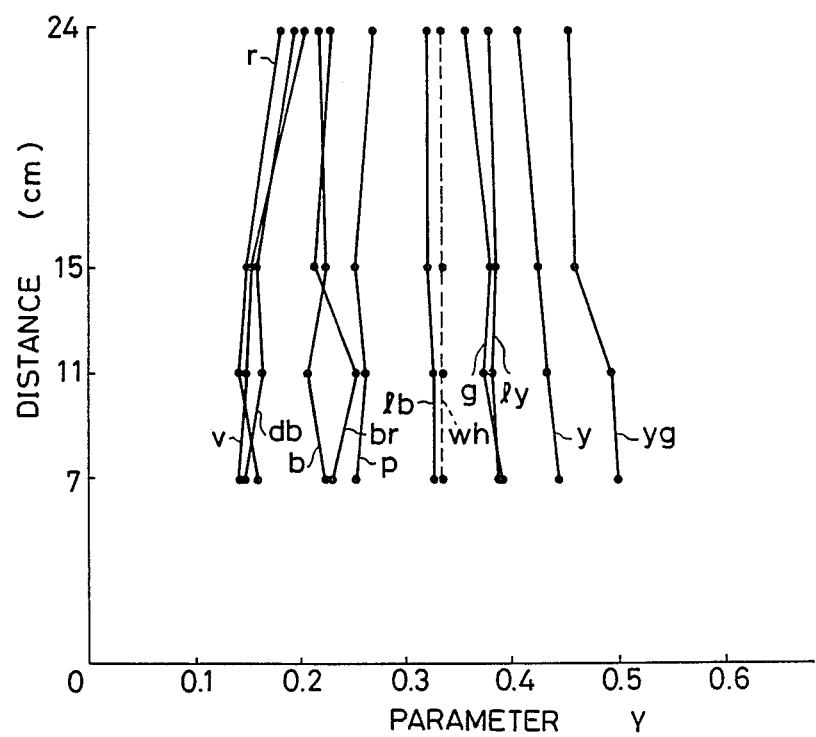
FIG. 8 is a graph showing the relation between the distance and color distinction parameter y for 13 different colors measured with the color distinction device shown in FIG. 2.
Figure 9:
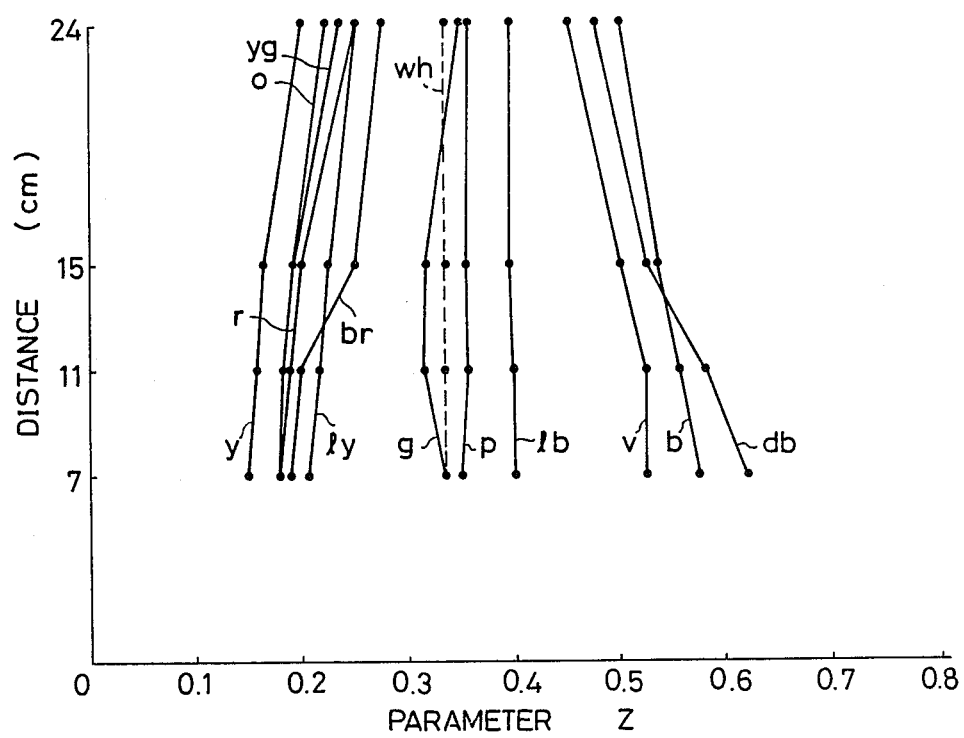
FIG. 9 is a graph showing the relation between the distance and color distinction parameter z for 13 different colors measured with the color distinction device shown in FIG. 2.
Figure 10:
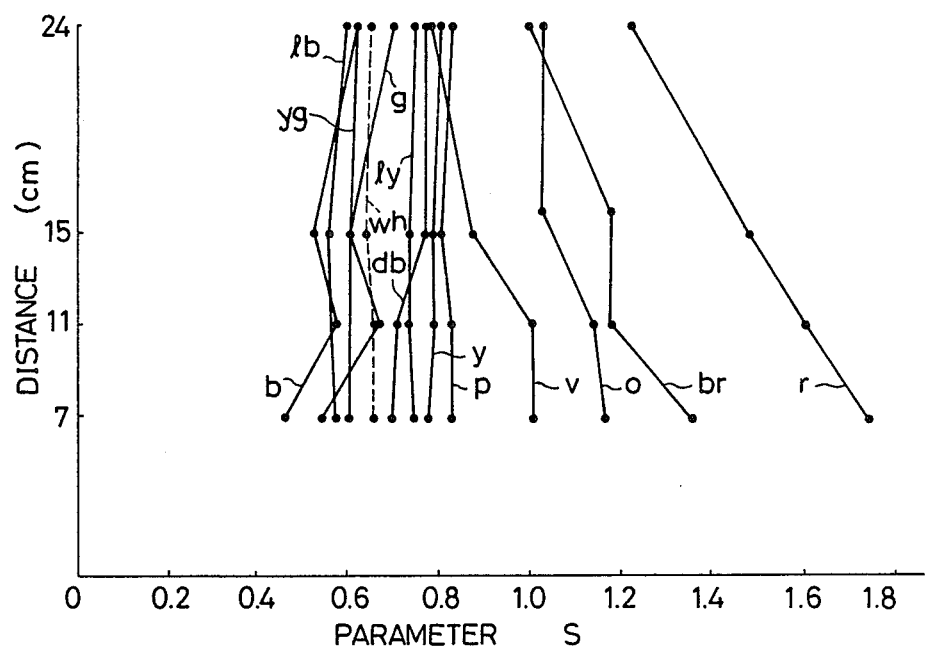
FIG. 10 is a graph showing the relation between the distance and color distinction parameter s for 13 different colors measured with the color distinction device shown in FIG. 2.
Figure 11:
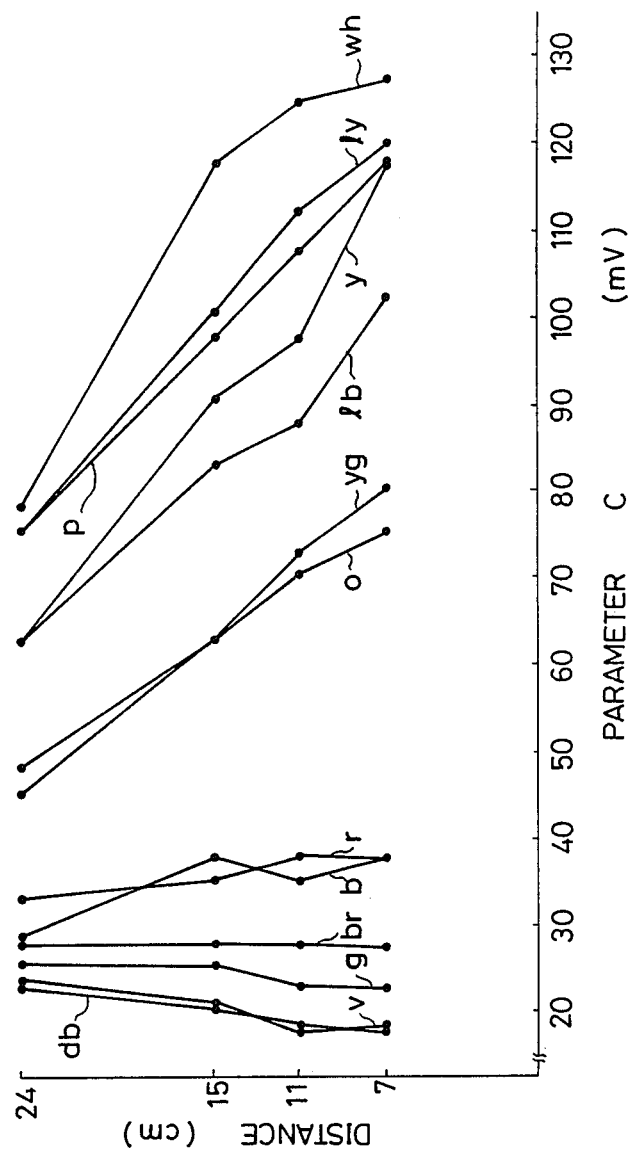
FIG. 11 is a graph showing the relation between the distance and color distinction parameter C for 13 different colors measured with the color distinction device shown in FIG. 2.

These threshold values and input value C were all stored in a memory of the microcomputer. Then, the four color distinction parameters x, y, z and s were obtained from the values obtained from the A/D converter input voltages with respect to 13 different colored paper sheets by changing the distance between the colored paper sheet and half mirror in a range of 7 to 24 cm. The values of x are shown in FIG. 7, the values of y are shown in FIG. 8, the values of z are shown in FIG. 9, and the values of s are shown in FIG. 10. The values of the color distinction parameter C are shown in FIG. 11.

The color distinction parameters are compared with the threshold values for the individual colors stored in the memory of the microcomputer until the former coincide with the latter. When the parameters coincide with the threshold values, the corresponding color number N is printed. Unless the parameters coincide with the threshold values, then the "Non-Coincidence" is printed.

As is seen from FIGS. 7 to 11, for each color the color distinction parameter may vary considerably with a change in the distance 1. For this reason, although the prior art color sensor with less color distinction parameters the accuracy of the color distinction is reduced when the distance between the color sensor and object is changed, according to the present invention accurate color distinction can be obtained even if the distance is changed.

Further, with the color distinction device shown in FIG. 6 the results of measurement of the A/D converter outputs when only the second dichroic mirror is used and the distance is set to 15 cm are as shown in Table 3, and the values of r, g and b obtained from these values are as shown in Table 4.

TABLE 3

| Input No. $C_n$ | Color | R (mV) | G (mV) | 3C (mV) |
|---|---|---|---|---|
| 1 | white | 100 | 100 | 300 |
| 2 | red | 60 | 12.5 | 70 |
| 3 | orange | 82.5 | 35 | 140 |
| 4 | brown | 32.5 | 15 | 55 |
| 5 | yellow | 90 | 90 | 230 |
| 6 | yellow green | 40 | 62.5 | 135 |
| 7 | green | 12.5 | 17.5 | 40 |
| 8 | blue | 17.5 | 17.5 | 65 |
| 9 | dark blue | 12.5 | 7.5 | 35 |
| 10 | violet | 17.5 | 7.5 | 35 |
| 11 | light blue | 62.5 | 75 | 220 |
| 12 | light yellow | 87.5 | 82.5 | 220 |
| 13 | pink | 90 | 57.5 | 215 |

TABLE 4

| Input No. $C_n$ | Color | r | g | b |
| --- | --- | --- | --- | --- |
| 1 | white | 0.333 | 0.333 | 0.333 |
| 2 | red | 0.857 | 0.179 | −0.036 |
| 3 | orange | 0.589 | 0.500 | 0.160 |
| 4 | brown | 0.591 | 0.273 | 0.136 |
| 5 | yellow | 0.391 | 0.391 | 0.217 |
| 6 | yellow green | 0.296 | 0.463 | 0.241 |
| 7 | green | 0.313 | 0.438 | 0.250 |
| 8 | blue | 0.269 | 0.538 | 0.460 |
| 9 | dark blue | 0.357 | 0.214 | 0.429 |
| 10 | violet | 0.500 | 0.214 | 0.286 |
| 11 | light blue | 0.284 | 0.341 | 0.376 |
| 12 | light yellow | 0.398 | 0.375 | 0.227 |
| 13 | pink | 0.419 | 0.267 | 0.314 |

The color distinction was carried out by setting the distance between the colored paper sheet and half mirror to 15 cm. Accurate color distinction could be obtained with the prepared 13 different colored paper sheets although slight fluctuations were recognized in red and other outputs.

What is claimed is:

1. A device for color distinction comprising:

half mirror means disposed on an optical path of measurement light emitted from a specific point on an object for color distinction;

a complementary sensing device disposed on an optical path of light reflected from said half mirror means, a value detected by said complementary sensing device serving as a first parameter for color distinction;

first dichroic mirror means disposed on an optical path of light transmitted from said half mirror means, and having a characteristic of reflecting a first color component and transmitting second and third color components of lights;

first optical sensing means disposed on an optical path of light reflected from said first dichroic mirror means;

second dichroic mirror means disposed on an optical path of light transmitted from said first dichroic mirror means, and having a characteristic of reflecting said second color component and transmitting said first and third color components of light;

second optical sensing means disposed on an optical path of light reflected from said second dichroic mirror means;

third optical sensing means disposed on an optical path of light transmitted from said second dichroic mirror means;

means for obtaining chromaticity coordinate value of said first, second and third color components of light from values detected by said first, second and third optical sensing means, said chromaticity coordinate values serving as second, third and fourth parameters for color distinction, respectively;

means for obtaining a composition ratio of said first color component of light from the values detected by said complementary sensing device and by said first optical sensing means, said composition ratio serving as a fifth parameter for color distinction; and means having five standard parameters for color distinction stored therein for comparing said first to fifth parameters for color distinction with the five stored standard parameters to make a color distinction of said object.

2. A device for color distinction comprising:

half mirror means disposed on an optical path of measurement light emitted from a specific point on an object for color distinction;

a complementary sensing device disposed on an optical path of light reflected from said half mirror means;

dichroic mirror means disposed on an optical path of light transmitted from said half mirror means, and having a characteristic of reflecting a first color component and transmitting second and third color components of light;

first optical sensing means disposed on an optical path of light reflected from said dichroic mirror means;

second optical sensing means disposed on an optical path of light transmitted from said dichroic mirror means, and being sensitive only to said second color component of light;

means for obtaining a chromaticity coordinate value of said first color component of light from values detected by said complementary sensing device and by said first optical sensing means, said chromaticity coordinate value serving as a first parameter for color distinction;

means for obtaining another chromaticity coordinate value of said second color component of light from values detected by said complementary sensing device and by said second optical sensing means, said another chromaticity coordinate value serving as a second parameter for color distinction;

means for obtaining the difference between the value detected by said complementary sensing device and the sum of said first and second parameters, said difference serving as a third parameter for color distinction; and means having three standard parameters for color distinction stored therein for comparing said first to third parameters for color distinction with the three stored standard parameters to make a color distinction of said object.

* * * * *